Patented Oct. 29, 1946

2,410,119

UNITED STATES PATENT OFFICE 2,410,119

PRODUCTION OF TITANIUM COMPOUNDS

Ray Leroy McCleary, Wilmington, Del., assignor to E. I. du Pont de Nemours & Company, Wilmington, Del., a corporation of Delaware No Drawing. Application October 5, 1944, Serial No. 557,381

4 Claims. (Cl. 260—429)

This invention relates to new compositions of matter, and more particularly to a novel titanium oxygen compound containing a minor amount of chlorine or other halogen, and to novel methods for preparing the same.

Concentrated or dilute aqueous solutions of titanium are readily prepared from titanium sulfate crystals, such as titanyl sulfate $$(TiOSO_4.2H_2O)$$

or from anhydrous titanium tetrachloride $(TiCl_4)$. These titanium compounds are difficult to obtain and remain more or less unavailable because of the difficulties involved in their preparation as well as their distribution. Titanyl sulfate is ordinarily prepared by dissolving in concentrated sulfuric acid a titanium dioxide precipitate such as is produced from the hydrolysis of a titanium salt solution in the manufacture of titanium pigments, the dissolved $TiO_2$ being then crystallized by adding more sulfuric acid to the aqueous solution. The resulting crystals may be separated from the sulfuric acid by means of a centrifuge and alcohol washing to provide relatively pure titanyl sulfate. This compound is sensitive to atmospheric moisture and hence must be shipped in closed containers to avoid undesired changes in its composition prior to use. Titanium tetrachloride is even more difficult to handle and objectionable for distribution and use as an industrial chemical. Its vapors readily react with atmospheric moisture to give the well-known smoke screen effect. In addition, aqueous solutions are difficult to prepare therefrom, due to the evolution of hydrochloric acid gases resulting from the high heat of solution of the anhydrous chloride in water. Hence, it also must be handled with caution and transported in closed containers.

Soluble titanium compounds useful in preparing titanium solutions have not been widely sold or distributed industrially. This is believed to be due in large measure to the lack of availability of a useful dry titanium chemical or compound which is stable under ordinary conditions and is amenable to being transported in ordinary containers. Titanium compounds have been proposed for use in the treatment of leather, silk, cellulosic products and rubber, but their usefulness in such applications has been restricted to processes utilizing the dry form of titanium oxide pigment, due to its whiteness, opacity and high refractive index.

It has been found that a soluble form of titanium compound can be readily obtained in accordance with this invention and that such compound can be readily employed in these industries and applications. Accordingly, it is an object of this invention to provide a novel form of such compound as well as novel methods for effecting its preparation. Another object is to provide a method for the preparation of such water-soluble compound by interacting an anhydrous tetrahalide with a tertiary alcohol. A still further object is to produce a dry, powdery form of soluble titanium oxygen compound containing minor amounts of halogen, especially chlorine, and carbon in combined form, and which will readily dissolve or disperse in aqueous media to provide a solution of high fluidity. Further objects will appear hereinafter.

The foregoing and other objects are obtainable in this invention which broadly comprises preparing a soluble titanium compound by interacting an anhydrous titanium halide with a tertiary alcohol.

In a more specific and preferred embodiment, the invention comprises reacting anhydrous titanium tetrachloride with an excess concentration of dry tertiary butyl alcohol and while maintaining the reactants at a temperature below about 50° C.

In practically adapting the invention, an anhydrous halide, such as the chloride, bromide or iodide, but preferably titanium tetrachloride, is added to an excess (above theoretical) of a tertiary alcohol, preferably tertiary butyl alcohol, at room temperature. The reaction is conducted at a temperature below 60° C., and preferably at from 30° C. to 50° C. The anhydrous halide reacts rapidly with the tertiary alcohol upon contact forming a yellow-white precipitate comprising the corresponding chloride or halide. This precipitate soon goes into solution and forms a yellow-orange liquor. This liquor is then heated to evaporate any volatile reaction products formed as a result of the halide and alcohol reaction, as well as to remove any excess of the latter reactant. For instance, when the preferred reactants (dry tertiary butyl alcohol, having a boiling point of about 83° C., and titanium tetrachloride) are used, tertiary butyl chloride is formed which has a boiling point of about 52° C. During the evaporation step this chloride is removed and the final, preferred product, after drying at an elevated temperature comprises a stable, dry titanium compound of substantially the following composition:

|  | Per cent |
|---|---|
| Titanium | 38.00 |
| Chlorine | 11.25 |
| Carbon | 2.43 |
| Hydrogen | 3.45 |

The exact chemical formula or constitution of this reaction product, however, is not presently definitely known. If desired, the organic reaction product formed in the reaction may be reconverted to the tertiary alcohol and reused in the process, thereby providing a cyclic system.

The compound of this invention does not absorb moisture from the air, and exhibits a remarkable solubility in water. It is also soluble in ethyl alcohol and normal butyl alcohol, but is practically insoluble in the tertiary butyl alcohol used in its manufacture, as well as in ether or an ester such as butyl glycolate.

The invention is further illustrated by the following specific examples which are given for the purpose of disclosing particular details of the operation but are not to be taken as in limitation of its underlying principles and scope:

Example I 1000 parts of tertiary butyl alcohol were introduced into a reaction vessel and 250 parts of anhydrous titanium tetrachloride were then added thereto in a drop-wise manner. A condenser was attached to said vessel and the whole heated gently. As a result, boiling took place at 51–52° C. for a considerable time, the temperature gradually rising to 60° C. The reaction product, after becoming solid, was removed from the flask and dried at room temperature upon 24 hours' exposure to the air. Thereafter it was analyzed and further examined, the dry material being found to be very water-soluble and contained 59.68% $TiO_2$. After ignition of a portion, the residue was found to consist of rutile crystalline $TiO_2$ with no trace of anatase present.

Example II

Four volumes of tertiary butyl alcohol were placed in an acid-resisting container and one volume of anhydrous titanium tetrachloride was slowly added thereto while maintaining the temperature of the reaction vessel below about 46° C. After the addition, cooling was discontinued. Solid matter appeared in the mixture but went into solution shortly thereafter. Heat was then applied and a jelly-like mass soon appeared. Boiling began at 51° C. and after considerable volatile matter was removed the temperature rose to 57° C. when the product appeared dry. The material was then removed from the container and further dried over a water bath at 65° C. for one hour. Upon analysis, the resulting product was found to contain 60.3% $TiO_2$ and was useful in the preparation of a slightly opalescent aqueous solution which contained in excess of 100 grams of $TiO_2$ per liter.

Although my process has been above illustrated as applied to the preferred reaction between tertiary butyl alcohol and titanium tetrachloride, it is not limited to these reagents. Thus, the tertiary butyl alcohol may be replaced by other tertiary alcohols, of the general formula $R_3COH$ in which R consists of alkyl radicals having the same or differing numbers of carbon atoms. In addition to tertiary butyl alcohol, tertiary amyl, hexyl, heptyl and octyl alcohols are contemplated as useful, equivalent reagents in the invention.

As disclosed above, the novel titanium oxygen composition of this invention is useful in the preparation of relatively concentrated or dilute titanium solutions which have a slightly opalescent appearance or characteristic. I have not definitely ascertained whether these solutions comprise true solutions or whether the titanium is present largely as a colloidal dispersion. Coagulation tests, however, give evidence that the titanium approaches molecular fineness from an examination of the flocculate produced by neutralization with dilute ammonia. This product has the appearance of ortho-titanic acid and closely resembles the precipitate formed by the neutralization of either titanium sulfate solution or titanium tetrachloride solution. Regardless of the state of solution of the titanium compound, said solution is usefully adaptable in the trade as a substitute for solutions prepared from anhydrous titanium tetrachloride which find wide usage in the leather, textile, paper, plastics and other industries.

I claim as my invention:

1. A process for obtaining a water-soluble titanium oxygen compound comprising reacting a titanium halide with a tertiary alcohol.

2. A process for obtaining a water-soluble titanium oxygen compound which comprises reacting at a temperature below about 50° C. an anhydrous titanium halide with an excess molecular concentration of a tertiary alcohol.

3. A process for producing a water-soluble titanium oxygen compound which comprises reacting at a temperature below about 50° C. anhydrous titanium tetrachloride with tertiary butyl alcohol.

4. A process for producing a water-soluble titanium oxygen compound which comprises reacting at a temperature below 50° C. anhydrous titanium tetrachloride with a molecular excess of dry tertiary butyl alcohol, upon completion of the reaction evaporating the reaction liquor to remove any volatile reaction products formed, and then drying and recovering the final product.

RAY LEROY McCLEARY.